(12) United States Patent
Inoue et al.

(10) Patent No.: US 7,019,071 B2
(45) Date of Patent: Mar. 28, 2006

(54) BINDER FOR INORGANIC FIBER AND HEAT INSULATING ACOUSTIC INORGANIC FIBER MATERIAL

(75) Inventors: Akira Inoue, Tokyo (JP); Yuka Masaki, Tokyo (JP); Manabu Iizuka, Tokyo (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 71 days.

(21) Appl. No.: 10/287,506

(22) Filed: Nov. 5, 2002

(65) Prior Publication Data

US 2003/0104740 A1 Jun. 5, 2003

(30) Foreign Application Priority Data

| Nov. 6, 2001 | (JP) | ............................ 2001-340296 |
| Feb. 21, 2002 | (JP) | ............................ 2002-045067 |
| Sep. 4, 2002 | (JP) | ............................ 2002-258401 |

(51) Int. Cl.
*C08G 8/04* (2006.01)

(52) U.S. Cl. ................. 524/593; 524/594; 525/158; 428/288; 428/421

(58) Field of Classification Search ............. 524/593, 524/594; 525/158; 428/421, 288
See application file for complete search history.

(56) References Cited

U.S. PATENT DOCUMENTS

| 3,935,139 A * | 1/1976 | Ashall .................... 524/594 |
| 4,916,020 A * | 4/1990 | Golding et al. ............ 428/421 |
| 5,143,582 A | 9/1992 | Arkens et al. .............. 162/135 |
| 5,143,729 A * | 9/1992 | Thompson ................ 252/8.62 |
| 5,300,562 A * | 4/1994 | Coventry et al. ........... 524/841 |
| 5,302,316 A | 4/1994 | Hashimoto et al. .... 252/183.11 |
| 5,340,868 A | 8/1994 | Strauss et al. ............. 524/461 |
| 5,578,371 A * | 11/1996 | Taylor et al. ............... 442/327 |
| 6,769,455 B1 * | 8/2004 | Toas et al. ................. 138/149 |

FOREIGN PATENT DOCUMENTS

| DE | 43 38 118 | 5/1995 |
| EP | 0 257 863 | 3/1988 |
| EP | 0 333 464 | 9/1989 |
| EP | 0 460 523 | 12/1991 |
| EP | 1 022 263 | 7/2000 |
| EP | 1361200 A2 * | 11/2003 |
| GB | 719 466 | 12/1954 |
| JP | 61-281080 | 12/1986 |
| JP | 4-57833 | 2/1992 |
| JP | 5-61230 | 9/1993 |
| JP | 5-330861 | 12/1993 |
| JP | 7-10611 | 1/1995 |
| JP | 7-157979 | 6/1995 |
| JP | 8-208947 | 8/1996 |
| JP | 2863585 | 12/1998 |
| JP | 2894799 | 3/1999 |
| JP | 2000-327797 | 11/2000 |
| WO | WO 99/36368 | 7/1999 |

OTHER PUBLICATIONS

Derwent Publications, XP-002254670, JP 2000-044650, Feb. 15, 2000.
Derwent Publications, XP-002254671, JP 5-330861, Dec. 14, 1993.
MicropatPatent Index Database—English Abstract of JP 2000-327797A.
MicropatPatent Index Database—English Abstract of JP61281080A.
MicropatPatent Index Database—English Abstract of JP4057833A.
MicropatPatent Index Database—English Abstract of JP JP7157979A.
MicropatPatent Index Database—English Abstract of JP08208947.

* cited by examiner

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

A binder for inorganic fiber, which comprises an aldehyde condensable thermosetting resin precursor and a fluorocarbon compound having a polyfluoroalkyl group.

15 Claims, No Drawings

BINDER FOR INORGANIC FIBER AND HEAT INSULATING ACOUSTIC INORGANIC FIBER MATERIAL

The present invention relates to a binder for inorganic fiber to be used as a heat insulating material or an acoustic material for housing, sound insulating walls, etc. More particularly, it relates to a binder for inorganic fiber, which is capable of imparting excellent water repellency over a long period of time and a heat insulating acoustic inorganic fiber material employing such a binder.

Heretofore, an aggregate of inorganic fiber has been widely used as a heat insulating material or an acoustic material for housing, buildings, sound insulating walls, cooling towers, instruments installed outdoors, etc., since it has a high porosity and compartmentalized into fine spaces by monofilaments of such inorganic fiber so that air contained in such an aggregate is hardly movable.

However, if water such as rainwater or dew drop is absorbed by the aggregate of inorganic fiber, the heat insulating or acoustic insulating performance may decrease, and germination of fungi or corrosion of metal portions, etc. which are in contact with the aggregate of inorganic fiber, may be led. Accordingly, an aggregate of inorganic fiber which is likely to be in contact with water, is required to have low water absorptivity and high water repellency, as far as possible.

With respect to such a requirement, e.g. Japanese Patent No. 2,863,585 discloses that various organopolysiloxanes may be used as treating agents to improve water repellency of inorganic fiber.

Further, JP-A-5-330861 discloses a resin composition for hydrophobic treatment of heat-insulating glass fiber, containing a metal soap as-an effective component.

Further, JP-A-7-10611 discloses a scattering preventive agent having an amine salt of a higher fatty acid incorporated to a mineral oil and/or synthetic oil, which is capable of imparting high water repellency to a glass wool molded material.

However, with the organopolysiloxanes and the metal soap i.e. the water repellents proposed to be used in the prior art, the water repellency is inadequate, and it is necessary to use large amounts of such water repellents.

However, if large amounts of the organopolysiloxanes are contained, stickiness tends to result, whereby the operation efficiency for the application tends to be poor, and the cost tends to be expensive, such being undesirable. On the other hand, if the above metal soap is contained in a large amount, adhesion of inorganic fibers to one another tends to be poor, whereby there has been a problem that the function as a binder tends to be low.

Further, with a binder employing an organopolysiloxane or a metal soap as a water repellent, there has been a problem that a part of the water repellent is likely to flow out from the inorganic fiber surface as time passes, whereby the water repellency tends to decrease with time.

Further, the organopolysiloxane or the metal soap to be used as a water repellent, is hydrophobic, and in order to uniformly mix it with an aqueous binder, it is necessary to preliminarily emulsify it by means of e.g. a surfactant to obtain an aqueous dispersion. Therefore, in the binder, a highly hydrophobic water repellent component and a hydrophilic surfactant are coexistent, and with an organopolysiloxane or a metal soap which is inferior in the water repellency as compared with a fluorine compound, the water repellency of the water repellent component is likely to be impaired by the surfactant. On the other hand, if the amount of the surfactant is too small, the stability of the water repellent in the aqueous binder tends to be poor, and miscibility with the aqueous binder tends to be poor, whereby the desired water repellency may not be obtained in some cases.

Further, depending upon the site for the application of the heat insulating acoustic inorganic fiber material, a film to prevent moisture or dust, or a facing material such as a decoration material, may sometimes be bonded directly on the surface of the heat insulating acoustic inorganic fiber material by an adhesive. However, when an organopolysiloxane or a metal soap is used as a water repellent, the water repellent is likely to bleed out on the inorganic fiber surface to deteriorate the adhesion of the adhesive to the heat insulating acoustic inorganic fiber material, whereby the above film or the like may not properly be bonded, or the adhesive strength may decrease as the time passes, and eventually the film may peel.

Further, with the heat insulating acoustic inorganic fiber material obtained by using the binder having a scattering preventive agent incorporated, as disclosed in JP-A-7-10611, the scattering preventive effect can be obtained, but adequate water repellency may not be obtained in some cases.

Accordingly, it is an object of the present invention to provide a binder for inorganic fiber, which is capable of imparting excellent water repellency over a long period of time and which is excellent in the stability despite it is of an aqueous type and is free from impairing the adhesion with the facing material, etc., and a heat insulating acoustic inorganic fiber material employing such a binder.

In order to accomplish the above object, the present invention provides a first binder for inorganic fiber, which comprises an aldehyde condensable thermosetting resin precursor and a fluorocarbon compound having a polyfluoroalkyl group (hereinafter referred to simply as a "fluorocarbon compound" unless otherwise specified).

According to this invention, the fluorocarbon compound has high water repellency, and adequate water repellency can be obtained even by treatment with a small amount, and yet, a function as a binder, such as an adhesive property, will not be impaired.

In the binder for inorganic fiber of the present invention, the fluorocarbon compound has a functional group reactive with the aldehyde condensable thermosetting resin precursor or with inorganic fiber.

It is thereby possible that at the time of applying the binder to inorganic fiber, followed by thermosetting, the fluorocarbon compound will react with the inorganic fiber or the aldehyde condensable thermosetting resin precursor as the main component of the binder, whereby the fluorocarbon compound will securely be fixed to the thermosetting resin and/or the inorganic fiber, whereby the water repellency of the inorganic fiber will not decrease with time. Further, as the water repellent is fixed in the binder, there will be no bleed out of the water repellent on the inorganic fiber surface, as observed in a case where an organopolysiloxane or a metal soap is used as a water repellent.

In the binder for inorganic fiber of the present invention, it is preferred that the aldehyde condensable thermosetting resin precursor and the fluorocarbon compound having a polyfluoroalkyl group are contained so that, as calculated as solid content, the fluorocarbon compound having a polyfluoroalkyl group is from 0.1 to 10 parts by mass per 100 parts by mass of the aldehyde condensable thermosetting resin precursor.

By adjusting the ratio of the fluorocarbon compound to the aldehyde condensable thermosetting resin precursor to a level within the above preferred range, it is possible to impart adequate water repellency to the heat insulating acoustic inorganic fiber material, and the stability of the binder will not be impaired. Further, it is preferred that the molecular weight or the number average molecular weight of the above fluorocarbon compound is at least 500. Accordingly, at the time of thermosetting the binder, there will be no possibility that a fluorocarbon compound having a low molecular weight evaporates by abrupt heating, whereby the water repellency can effectively be developed even by application of a small amount.

Further, the present invention provides a second binder for inorganic fiber, which comprises an aldehyde condensable thermosetting resin precursor and an ammonium salt and/or an amine salt of at least one fatty acid selected from $C_{10-30}$ saturated fatty acids and $C_{10-30}$ unsaturated fatty acids (hereinafter referred to simply as a "fatty acid" unless otherwise specified).

According to the above second aspect of the present invention, the fatty acid for developing water repellency is present in the form of an ammonium salt and/or an amine salt, whereby the hydrophilicity tends to be strong, and a binder having good stability will be obtained, whereby it is not necessary to use a surfactant even when mixed with an aqueous binder. Here, the aqueous system includes an aqueous solution wherein water is the solvent and an aqueous dispersion wherein water is the dispersing medium.

Further, at the time of thermosetting the inorganic fiber having this binder applied, the aldehyde condensable thermosetting resin precursor as the main component of the binder and a part of the fatty acid undergo an esterification reaction, whereby fixing of the thermosetting resin, the fatty acid and the inorganic fiber will be excellent. On the other hand, at the time of thermosetting, the majority of ammonium ions and/or amines contained in the ammonium salt and/or the amine salt of the fatty acid will evaporate, and the proportion remaining in the binder after the thermosetting will be low, whereby water repellency of the inorganic fiber will not be impaired.

In the second binder for inorganic fiber of the present invention, the aldehyde condensable thermosetting resin precursor and the ammonium salt and/or the amine salt of the fatty acid are contained so that, as calculated as solid content, the ammonium salt and/or the amine salt of the fatty acid is from 0.1 to 10 parts by mass per 100 parts by mass of the aldehyde condensable thermosetting resin precursor.

By adjusting the ratio of the ammonium salt and/or the amine salt of the fatty acid to the aldehyde condensable thermosetting resin precursor to the above preferred range, adequate water repellency can be imparted to the heat insulating acoustic inorganic fiber material, and yet, the stability of the binder will not be impaired.

Further, the second binder preferably comprises the aldehyde condensable thermosetting resin precursor and the ammonium salt of the fatty acid. If ammonium ions will remain in the binder after the thermosetting, they are less likely to impair the water repellency of the heat insulating acoustic inorganic fiber material, as compared with a case where amines will remain, provided that the fatty acid is the same in both cases.

Further, it is preferred that the first or second binder for inorganic fiber further contains a silane coupling agent. It is thereby possible to increase the adhesion of the binder with the inorganic fiber thereby to prevent deterioration with time of the water repellency.

On the other hand, the present invention provides a heat insulating acoustic inorganic fiber material obtained by applying the first or second binder for inorganic fiber to inorganic fiber immediately after formation of the inorganic fiber, collecting the inorganic fiber into wool, followed by thermosetting for shaping.

According to this invention, it is possible to obtain a heat insulating acoustic inorganic fiber material which is free from stickiness of the inorganic fiber surface and capable of maintaining excellent water repellency for a long period of time and which has good processability for adhesion with e.g. a facing material for decoration or for preventing dust or moisture.

Now, the present invention will be described in detail with reference to the preferred embodiments.

The first binder for inorganic fiber according to the present invention, comprises an aldehyde condensable thermosetting resin precursor and a fluorocarbon compound having a polyfluoroalkyl group.

Further, the second binder for inorganic fiber according to the present invention, comprises an aldehyde condensable thermosetting resin precursor and an ammonium salt and/or an amine salt of at least one fatty acid selected from $C_{10-30}$ saturated fatty acids and $C_{10-30}$ unsaturated fatty acids.

Firstly, the aldehyde condensable thermosetting resin precursor will be described.

The aldehyde condensable thermosetting resin precursor to be used in the present invention may, for example, be a precursor of a resol type phenol resin, a melamine resin, a urea resin or a furan resin. In such a case, such precursors may be used alone or in combination as a mixture of two or more of them.

Here, the precursor in the present invention means the initial compound which forms a resol type phenol resin, a melamine resin, an urea resin or a furan resin by a reaction under heating. In such a case, there is no particular restriction as to the proportion of the monomer, the dimer, etc. contained in the precursor of each resin, or as to the number of addition of methylol groups per monomer.

The aldehyde condensable thermosetting resin precursor is a highly viscous liquid or solid, and for its application to inorganic fiber, it requires a medium such as water or an organic solvent. In a common process for producing a heat insulating acoustic inorganic fiber material, in many cases, a binder is applied in an atmosphere of at least 200° C. immediately after a melted inorganic material for fiber is formed into fiber by a centrifugal method. Accordingly, if a flammable solvent such as an organic solvent is contained, there is a danger of leading a fire. Therefore, the aldehyde condensable thermosetting resin precursor is preferably one dissolved or dispersed in water.

Now, the fluorocarbon compound having a polyfluoroalkyl group will be described.

The fluorocarbon compound to be used in the present invention is a compound having a polyfluoroalkyl group, which includes a compound with a relatively low molecular weight to an oligomer, homopolymer or copolymer of a monomer having a polyfluoroalkyl group.

Here, the polyfluoroalkyl group is a functional group having at least two hydrogen atoms in an alkyl group substituted by fluorine atoms, and the water repellency is provided by this functional group. The polyfluoroalkyl group may have a linear structure or a branched structure.

The carbon number of the polyfluoroalkyl group is pref erably from 4 to 20, and among these carbon atoms, the number of carbon atoms to which at least one fluorine atom is bonded, is at least 2, preferably from 4 to 18, particularly preferably from 6 to 16. The proportion of the number of fluorine atoms in the polyfluoroalkyl group is preferably such that (number of fluorine atoms in the polyfluoroalkyl group)/(number of all hydrogen atoms in a case of a hydrocarbon group having the same carbon number as the polyfluoroalkyl group) is at least 60%, particularly preferably at lest 80%.

Further, it is more preferred that the terminal portion of the polyfluoroalkyl group is a perfluoroalkyl group, whereby the water repellency will be further improved, and the perfluoroalkyl group is particularly preferably of a linear structure. Here, the perfluoroalkyl group is one having a structure in which all hydrogen atoms of the polyfluoroalkyl group are substituted by fluorine atoms. It is thereby possible to impart high water repellency to the binder even with a small amount of incorporation.

Further, the fluorocarbon compound to be used in the present invention, preferably has a functional group reactive with the aldehyde condensable thermosetting resin precursor or a functional group reactive with inorganic fiber, whereby the fluorocarbon compound will be firmly bonded to the aldehyde condensable thermosetting resin as the main component of the binder or to the surface of inorganic fiber, and deterioration of the water repellency with time, particularly flowing out of the water repellent by condensed water repeatedly formed when the heat insulating acoustic inorganic fiber material is used in a highly humidified environment, can be suppressed. Further, bleed out as observed with silicone oil or the like after thermosetting of the binder, will not take place, whereby the adhesion with the facing material for decoration or for preventing dust or moisture, will be excellent.

The functional group reactive with the aldehyde condensable thermosetting resin precursor, may, for example, be a hydroxyl group, an amino group, an epoxy group, a methylol group, a carboxyl group or an isocyanate group, preferably a hydroxyl group, an amino group, an epoxy group or a methylol group. Among them, an epoxy group or a methylol group is most preferred since it is reactive efficiently in a short time with the aldehyde condensable thermosetting resin precursor.

Further, the functional group reactive with the surface of inorganic fiber, may, for example, be a silanol group. For example, a functional group including chlorosilane, methoxysilane, ethoxysilane or the like which forms a silanol group by hydrolysis, is preferred. The following two types of structures may be mentioned as preferred structures for such a fluorocarbon compound having a polyfluoroalkyl group.

(1) The following structure wherein in the main chain, a polyfluoroalkyl group and the above functional group are present.

[Polyfluoroalkyl group]—[Bivalent or higher valent connecting group]—[Functional group]

Here, in the above structure, the bivalent or higher valent connecting group is not particularly limited. However, as mentioned hereinafter, preferred is one whereby the molecular weight or the number average molecular weight of the fluorocarbon compound would be at least 500. For example, a polyethylene group, a polyester group, a polyurethane group, a polyether group or a polycarbonate group may be mentioned.

(2) The following structure in which the main chain of polyethylene, polyester or the like, has side chains having a polyfluoroalkyl group and the above functional group respectively added thereto.

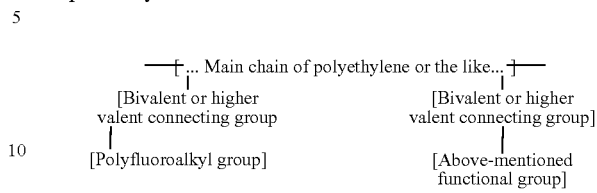

Here, as the bivalent or higher valent connecting group, the same group as the bivalent or higher valent connecting group in the structure of the above (1) is preferably employed.

In the structure of the above (2), a copolymer of a polyfluoroalkyl group-containing monomer with a copolymerizable monomer having a functional group, is more preferred, and it is particularly preferred that the polyfluoroalkyl group-containing monomer is an acrylate or methacrylate of a polyfluoroalkyl group having the following structure.

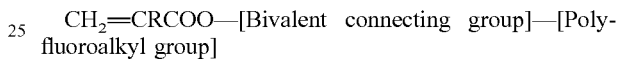

Here, the copolymerizable monomer having a functional group is preferably a monomer having a functional group such as a hydroxyl group, an amino group, an epoxy group or a methylol group. For example, a hydroxyalkyl acrylate, a hydroxyalkyl methacrylate, a glycidyl acrylate, a glycidyl methacrylate, an N-methylolacrylamide, an N-methylolmethacrylamide, an acrylamide, a methacrylamide, a diacetone acrylamide, a diacetone methacrylamide, or a methyloldiacetone acrylamide, is more preferred. In addition thereto, acrylic acid or methacrylic acid may, for example, be also employed.

In such a case, the copolymerization proportions of the acrylate or methacrylate of the polyfluoroalkyl group and the copolymerizable monomer having a functional group are preferably such that the polyfluoroalkyl group-containing monomer is at least 40 mass %, particularly preferably from 50 to 80 mass %, based on the total mass of the two.

Further, the fluorocarbon compound to be used in the present invention preferably has a molecular weight or a number average molecular weight of at least 500. Here, a molecular weight or a number average molecular weight of at least 500 means that in a case where the fluorocarbon compound is constituted by a single molecule, the molecular weight is at least 500, and in a case where it is constituted by an oligomer or a polymer of two or more molecules, the number average molecular weight is at least 500.

If the molecular weight or the number average molecular weight is less than 500, such a low molecular weight compound tends to evaporate and dissipate by a rapid temperature rise in the thermosetting stage during or after application of a binder in the process for producing a heat insulating acoustic inorganic fiber material, whereby the water repellency of the resulting heat insulating acoustic inorganic fiber material will be low, such being undesirable. Further, an excess fluorocarbon compound will be required to obtain a prescribed level of water repellency, such being uneconomical and undesirable.

In the binder for inorganic fiber according to the present invention, the fluorocarbon compound is contained preferably in an amount of from 0.1 to 10 parts by mass, more preferably from 0.5 to 5 parts by mass, particularly preferably from 1 to 5 parts by mass, per 100 parts by mass of the aldehyde condensable thermosetting resin precursor. If the content of the fluorocarbon compound is less than 0.1 part by mass, no adequate water repellency can be imparted to the resulting heat insulating acoustic inorganic fiber material. On the other hand, if the content of the fluorocarbon compound exceeds 10 parts by mass, the water repellency will not be improved in proportion to the increase of the content, such being uneconomical and undesirable.

In the present invention, it is preferred that the fluorocarbon compound is dispersed in water and then added to the aldehyde condensable thermosetting resin precursor, whereby it can be uniformly mixed with the aldehyde condensable thermosetting resin precursor similarly dispersed in water, and the compatibility with the binder will be excellent. Further, it is an aqueous dispersion system, and in the process for producing a heat insulating acoustic inorganic fiber material, the binder for inorganic fiber can be applied safely even in an atmosphere of at least 200° C. immediately after melting and forming into fiber, inorganic raw material for fiber.

As a method for dispersing it in water, a method may be mentioned in which various surfactants, such as polyethylene glycols, polyoxyethylene alkyl ethers, polyoxyethylene polyoxypropylene glycols, sorbitan fatty acid esters, polyoxysorbitan fatty acid esters, polyoxyethylene fatty acid esters, ethylene glycol fatty acid esters, glycerol fatty acid esters, ether carboxylic acid type surfactants and sulfosuccinate type surfactants, may be added to the fluorocarbon compound, followed by mixing and emulsifying.

Especially when the fluorocarbon compound is a copolymer of a polyfluoroalkyl group-containing monomer with a copolymerizable monomer having a functional group, the copolymerization of the polyfluoroalkyl group-containing monomer with the copolymerizable monomer, is preferably emulsion polymerization, whereby a fluorocarbon compound dispersed in water can directly be obtained, and to the obtained emulsified product, an additive may be incorporated, as the case requires, or the emulsified product may be diluted with water or the like.

In such a case, the surfactant, the polymerization initiator or the polymerization initiating source to be used for the emulsion polymerization, is not particularly limited. As the surfactant, any surfactant of anionic type, cationic type or nonionic type may be used. As the polymerization initiator, various polymerization initiators such as organic peroxides, azo compounds or persulfates may be used.

However, if an excess surfactant is used for emulsification, the surfactant is likely to attract water, whereby the water repellency of the fluorocarbon compound may be impaired. Therefore, the amount of the surfactant is preferably from 1 to 30 parts by mass, more preferably from 5 to 20 parts by mass, per 100 parts by mass of the fluorocarbon compound.

Now, the ammonium salt and the amine salt of at least one fatty acid selected from $C_{10-30}$ saturated fatty acids and $C_{10-30}$ unsaturated fatty acids, will be described. The $C_{10-30}$ saturated fatty acids to be used to obtain the ammonium salt and the amine salt of the fatty acid to be used in the present invention, include, for example, decanoic acid, undecylic acid, lauric acid, tridecylic acid, myristic acid, pentadecylic acid, palmitic acid, stearic acid, nonadecanoic acid, arachic acid, behenic acid, lignoceric acid, cerotic acid, heptacosanoic acid, montanic acid and melissic acid. The $C_{10-30}$ unsaturated fatty acids include, for example, oleic acid, elaidic acid, cetoleic acid, erucic acid, brassidic acid, linoleic acid, linolenic and arachidonic acid. The above fatty acids may be used alone, or two or more of them may be used in combination.

If the carbon number of the fatty acid is less than 10, a saturated fatty acid will be liquid at room temperature and will accordingly tend to flow out from the heat insulating acoustic inorganic material, whereby the water repellency is likely to deteriorate with time, and such may cause stickiness of the heat insulating acoustic inorganic material, which may impair the operation efficiency of e.g. the application, such being undesirable.

In the case of an unsaturated fatty acid having less than 10 carbon atoms, unsaturated bonds in the unsaturated fatty acid will be reacted with one another and solidified at the time of thermosetting the binder, whereby there will be no problem of stickiness as the above-mentioned saturated fatty acid. However, if the carbon number is less than 10, the hydrophobic linear structure portion in the unsaturated fatty acid becomes short, and the number of carboxyl groups per unit weight relatively increases, whereby the power of the unsaturated fatty acid to capture ammonium ion and/or amines, tends to be high. As a result, even after thermosetting the binder, it will remain in the form of ammonium salt of fatty acid and/or amine salt of fatty acid and thereby may impair the water repellency of the resulting heat insulating acoustic inorganic fiber material, such being undesirable.

On the other hand, if the carbon number of the fatty acid exceeds 30, the carboxyl group of the fatty acid will be neutralized with ammonia and/or amine, and even in such a salt form, dissolution or dispersion in water tends to be difficult, and a stabilized aqueous type binder can hardly be obtainable, and no adequate water repellency may be provided to the resulting heat insulating acoustic inorganic fiber material, such being undesirable.

The ammonium salt of the fatty acid to be used for the binder for inorganic fiber of the present invention, can be obtained by subjecting the fatty acid and ammonia to a neutralization reaction. Similarly, the amine salt of the fatty acid can be obtained by a neutralization reaction of the fatty acid and an amine.

The above-mentioned ammonia may, for example, be aqueous ammonia. The above-mentioned amine may, for example, be ethylamine, diethylamine, triethylamine, isopropylamine, diisopropylamine, propylamine, t-butylamine, sec-butylamine, diisobutylamine, 3-(methylamino)propylamine, 3-(diethylamino)propylamine, 3-(dibutylamino)propylamine, 3-(dimethylamino)propylamine, 3-(2-ethylhexyloxy)propylamine, 3,3'-iminobis(propylamine), N-methyl-3,3'-iminobis(propylamine), 2-ethylhexylamine, di-2-ethylhexylamine, 3-ethoxypropylamine, tetramethylethylenediamine, allylamine, diallylamine, triallylamine, tri-n-octylamine, 3-methoxypropylamine, N,N'-diethylethanolamine, N,N'-dimethylethanolamine, N,N'-dibutylethanolamine, N-(2-aminoethyl)ethanolamine, N-methyldiethanolamine, N-methylethanolamine, morpholine, N-methylmorpholine or N-ethylmorpholine.

Among them, it is more preferred to employ an ammonium salt of a fatty acid, which will not impair the water repellency of the heat insulating acoustic inorganic fiber material, even if it remains in the binder after thermosetting at the time of obtaining the heat insulating acoustic inorganic fiber material by thermosetting the binder for inorganic fiber.

The aqueous solution or the aqueous dispersion of the ammonium salt of the fatty acid to be used for the second binder for inorganic fiber of the present invention, can be obtained by heating the fatty acid to a temperature of at least the melting point, gradually adding aqueous ammonia thereto with stirring, followed by dissolving or dispersing it in water. In a similar manner, the amine salt of the fatty acid can be obtained by using an aqueous solution of an amine. Otherwise, a predetermined amount of aqueous ammonia and/or an amine may preliminarily be added to an aqueous binder containing the aldehyde condensable thermosetting resin precursor, and the above fatty acid may be added later.

In such a case, the aqueous ammonia and/or the amine is preferably added in an amount of from 0.7 to 1.2 equivalents per equivalent of the carboxyl groups of the fatty acid. Further, it is not necessary that all of the carboxyl groups in the fatty acid will react with the aqueous ammonia and/or the amine. Here, in a case where the temperature at the reaction becomes at least 100° C. at the time of heating the fatty acid, the aqueous ammonia and/or the amine to neutralize the fatty acid, is likely to evaporate. Accordingly, it is preferably dissolved or dispersed in water under a pressurized state.

In the second binder for inorganic fiber of the present invention, the ammonium salt and/or the amine salt of the fatty acid is contained preferably from 0.1 to 10 parts by mass, more preferably from 1 to 5 parts by mass, particularly preferably from 2 to 4 parts by mass, per 100 parts by mass of the aldehyde condensable thermosetting resin precursor.

If the content of the ammonium salt and/or the amine salt of the fatty acid is less than 0.1 part by mass, no adequate water repellency can be imparted to the resulting heat insulating acoustic inorganic fiber material. Further, even if the content of the ammonium salt and/or the amine salt of the fatty acid exceeds 10 parts by mass, the water repellency will not be improved in proportion to the increase of the content, such being uneconomical and undesirable.

Further, in the first or second binder for inorganic fiber of the present invention, it is preferred to further incorporate a silane coupling agent in order to increase the adhesion of the binder with the inorganic fiber.

The number or type of the functional groups, the structure, etc., of the silane coupling agent to be used here, are not particularly limited. However, it is preferred to employ an amino silane coupling agent or an epoxy silane coupling agent, since it has good reactivity or compatibility with the aldehyde condensable thermosetting resin precursor as the main component of the binder. The amino silane coupling agent may, for example, be γ-(2-aminoethyl)aminopropyltrimethoxysilane or γ-(2-aminoethyl)aminopropylmethyldimethoxysilane, and the epoxysilane coupling agent may, for example, be γ-glycidoxypropyl trimethoxysilane or γ-glycidoxypropylmethyl dimethoxysilane.

The amount of the silane coupling agent to be incorporated, is preferably within a range of from 0.01 to 0.5 part by mass per 100 parts by mass of the aldehyde condensable thermosetting resin precursor. If the amount of the silane coupling agent is less than 0.01 part by mass, the effect to increase the adhesive force of the inorganic fiber and the binder tends to be poor, and when the resulting heat insulating acoustic material is exposed to an environment at a high temperature of e.g. at least 60° C. or under a high temperature high humidity condition, the water repellency may decrease with time in some cases, such being undesirable. Further, even if the amount of the silane coupling agent exceeds 0.5 part by mass, the adhesion between the inorganic fiber and the binder will not be improved and the effect to prevent deterioration with time of the water repellency will not be improved, in correspondence with the increased amount, such being uneconomical and undesirable.

To the binder for inorganic fiber of the present invention, a dustproof agent, a curing accelerator, a flame retardant, a colorant, etc. may be added, as the case requires. The curing accelerator may, for example, be sodium sulfate, ammonium sulfate, dodecyl benzenesulfonic acid or p-toluenesulfonic acid. The dustproof agent which contains a mineral oil or a synthetic oil as the main component, is used mainly to prevent scattering of inorganic fiber.

The above first or second binder for inorganic fiber is preferably diluted with a solvent containing water as the main component, so that the amount of the solid content will be from 5 to 30 mass %. At that time, mixing is carried out by means of a tank equipped with a stirrer such as a dissolver, whereby the binder for inorganic fiber of the present invention can be obtained.

Now, the heat insulating acoustic inorganic fiber material of the present invention, which is obtained by using the above-described first or second binder for inorganic fiber, will be described.

For the production of the heat insulating acoustic inorganic fiber material of the present invention, firstly, a molten inorganic starting material is formed into fiber by a fiber-forming apparatus, and immediately thereafter, the above-mentioned binder for inorganic fiber is applied to the inorganic fiber. Then, the inorganic fiber having the binder for inorganic fiber applied, is collected into wool on a conveyor belt, to form a bulky intermediate for the heat insulating acoustic inorganic fiber material, which is sent to e.g. a pair of upper and lower belt conveyors spaced to provide a desired thickness, followed by heating under pressure to cure the binder for inorganic fiber to form a heat insulating acoustic inorganic fiber material. Then, it may be covered with e.g. a facing material, as the case requires, and the obtained heat insulating acoustic inorganic fiber material is cut to have the desired width and length to obtain a product. Now, the respective steps will be described.

Firstly, inorganic fiber to be used in the present invention is not particularly limited, and glass wool, rock wool or the like, which is commonly used for the heat insulating acoustic material, may be employed. As a method for forming the inorganic starting material into fiber, various methods such as a super fine process, a steam blowing process and a centrifugal method (or a rotary method), may be employed. Especially when the inorganic fiber is glass wool, it is preferred to employ a centrifugal method. Further, the density of the objective heat insulating acoustic inorganic fiber may be a density which is commonly used in a heat insulting material or an acoustic material, and it is preferably within a range of from 5 to 300 kg/m$^3$.

Then, to apply the binder to the inorganic fiber, the binder may be coated or sprayed by means of e.g. a spray apparatus. The amount of the binder for inorganic fiber to be applied may be adjusted by the same method as for the conventional binder containing no water repellent. The amount of the binder to be applied is preferably within a range of from 0.5 to 15 mass %, more preferably within a range of from 0.5 to 9 mass %, as the amount of the solid content, based on the mass of the heat insulating acoustic inorganic fiber material having the binder applied, although it may vary depending upon the density or the application of the heat insulating acoustic inorganic fiber material.

The timing for applying the binder to the heat insulating acoustic inorganic fiber material may be at any time after formation of fiber. However, in order to efficiently apply the binder, it is preferred to apply it immediately after formation of the fiber. Further, the fluorocarbon compound may be applied as a binder having it mixed with the aldehyde condensable thermosetting resin precursor, but the fluorocarbon compound may be applied separately before or after applying the aldehyde condensable thermosetting resin precursor.

By thus applying the first or second binder for inorganic fiber of the present invention to inorganic fiber, it is possible to impart adequate water repellency to the heat insulating acoustic inorganic fiber material. The inorganic fiber having the binder applied by the above step will be collected into wool on a perforated conveyor to form a bulky intermediate of inorganic fiber. Here, at the time of collecting the fiber into wool on the conveyor, it is more preferred to carry out sucking by a suction apparatus from the side of the conveyor opposite to the side on which the inorganic fiber is collected into wool. Thereafter, the above intermediate of inorganic fiber which is continuously conveyed on the conveyor, is sent to a pair of upper and lower belt conveyors spaced to provide a desired thickness, and at the same time, the above-mentioned thermosetting resin precursor contained in the binder is cured by heated hot air, to form the heat insulating acoustic inorganic fiber material into a mat, which is then cut to have the desired width and length.

The temperature for curing the above-mentioned thermosetting resin precursor contained in the binder, is not particularly limited, but may be the same as a case where a conventional binder containing no water repellent, is applied, and it may be from 200 to 350° C. Further, the heating time is suitably selected within a range of from 30 seconds to 10 minutes depending upon the thickness and the density of the heat insulating acoustic inorganic fiber material.

The heat insulating acoustic inorganic fiber material of the present invention may be as it is, or may be covered with a facing material. As the facing material, paper, a synthetic resin film, a metal foil film, a nonwoven fabric, a woven fabric or a combination thereof may be employed. Further, for the facing material, it is preferred to employ a material having water repellency with low water absorptivity.

The heat insulating acoustic inorganic fiber material of the present invention, thus obtained, is free from bleed out or flowing out of the water repellent, whereby the processability for adhesion with the facing material is excellent.

Further, even when exposed to rainwater or dew drop, the water will not remain in the above-mentioned heat insulating acoustic material, whereby the heat insulating or acoustic performance will remain not deteriorated over a long period of time, and a problem of decay wood or corrosion of metal portions to be in contact, or germination of fungi, can be solved.

Further, in the production, processing or application of the heat insulating acoustic inorganic fiber material, the fluorocarbon compound or the fatty acid in the binder covers individual monofilaments of the inorganic fiber to make them scarcely breakable or to fix them so that broken fibers will not fall off, whereby scattering of the inorganic fiber can be suppressed. Further, the fluorocarbon compound or the hydrophobic moiety of the fatty acid which is present at the contact face between the heat insulating acoustic inorganic material and the conveyor, will improve the release property of the heat insulating acoustic inorganic fiber material from the conveyor, whereby the possible trouble during the production can be reduced.

Now, the present invention will be described in further detail with reference to Examples. In the following description, "parts" and "%" are based on mass, unless otherwise specified.

Preparation of an Emulsion of a Fluorocarbon Compound

Preparation 1

To 100 parts of a fluorocarbon compound represented by the following chemical formula (I) and having a molecular weight of 656, 50 parts of methyl isobutyl ketone (MIBK) was added and dissolved at 70° C. to obtain a solution. Then, 8 parts of polyethylene glycol monostearate (HLB11.9) and 2 parts of coconut oil fatty acid sorbitan (HLB4.7) were added, followed by heating to 90° C. Then, the mixture was emulsified by a high pressure homogenizer. This emulsion was depressurized at 50° C. to remove the contained MIBK, thereby to obtain an emulsion having a solid content of 30% (content of the fluorocarbon compound: 27.3%).

$$CF_3(CF_2)_9SO_2N(CH_3)CH_2CH_2OH \tag{I}$$

Preparation 2

A fluorocarbon compound represented by the following chemical formula (II) and having a molecular weight of 398 was emulsified in the same manner as in Preparation 1 to obtain an emulsion having a solid content of 30% (content of the fluorocarbon compound: 27.3%).

$$CF_3(CF_2)_4CH_2CH_2OH \tag{II}$$

Preparation 3

Into a reaction vessel equipped with a stirrer, 120 parts of a perfluoroalkylethyl acrylate represented by the following chemical formula (III), 4 parts of N-methylolacrylamide, 10 parts of polyoxyethylene lauryl ether (HLB12.4), 2 parts of dipalmityldimethylammonium chloride, 120 parts of acetone, 350 parts of water and 1 part of azobisisobutylamidine hydrochloride, were added, and replacement with nitrogen was carried out for about 15 minutes with stirring. Then, the temperature was raised to 60° C. to initiate the polymerization. After stirring at the temperature of 60° C. for 12 hours, the mixture was cooled to obtain an emulsion having a solid content of 31% (content of the fluorocarbon compound: 28.3%).

$$CH_2\!\!=\!\!CHCOOCH_2CH_2(CF_2)_nCF_3 \tag{III}$$

(a mixture of compounds wherein n is 5, 7, 9, 11 and 13, and the average of n is 8).

Preparation 4

Into a reaction vessel equipped with a stirrer and a tank for dropping a monomer, 10 parts of polyoxyethylene lauryl ether (HLB12.4), 2 parts of stearyltrimethylammonium chloride and 330 parts of water, were added, and the temperature was raised to 70° C. with stirring. On the other hand, 120 parts of the perfluoroalkylethyl acrylate of the chemical formula (III) as used in Preparation 3, 10 parts of 2-hydroxyethyl methacrylate and 1 part of azobisisobutylamidine hydrochloride, were mixed and then put into the tank for dropping a monomer. The monomer was dropped into the reaction vessel while controlling the dropping rate so that dropping of the entire amount of the monomer would be completed in 3 hours. Upon expiration of 1 hour after completion of the dropping, a mixture comprising 0.1 part of azobisisobutylamidine hydrochloride and 1 part of water, was added to the reaction product in the reaction vessel. At that time, stirring was continued while maintaining the temperature of reaction product at 70° C. After 2 hours, the same operation was further repeated, and stirring while maintaining the temperature was continued. After 3 hours, the mixture was cooled to obtain an emulsion having a solid content of 30% (content of the fluorocarbon compound: 27.4%).

Preparation of an Aqueous Dispersion of Zinc Stearate

Preparation 5

60 Parts of zinc stearate was heated to 130° C. i.e. higher than the melting point and melted, and then, 5 parts of polyoxyethylene polyoxypropylene was added with stirring. After completion of the mixing, 200 parts of water was dropwise added with stirring to obtain an aqueous dispersion having a solid content of 24.5% (content of zinc stearate: 22.6%).

Preparation of an Aqueous Dispersion of Poly(dimethylsiloxane)

Preparation 6

To 60 parts of poly(dimethylsiloxane) having a molecular weight of about 5,000, 15 parts of polyoxyethylene polyoxypropylene was added. 200 Parts of water was dropwise added with stirring to obtain an aqueous dispersion having a solid content of 27.3% (content of poly(dimethylsiloxane): 21.8%).

Preparation of an Ammonium Salt of a Fatty Acid or an Amine Salt of a Fatty Acid Preparation 7

To 100 parts of water, 60 parts of stearic acid was added, and the stearic acid was completely melted by heating to 72° C. i.e. the melting point of the stearic acid, with stirring. In this state, stearic acid is present as oil droplets in water. Then, a mixture comprising 73.9 parts of 10% aqueous ammonia and 100 parts of water, was dropwise added to the above-mentioned molten stearic acid/water mixture, with stirring, to obtain an aqueous dispersion of ammonium stearate having a solid content of 20%.

Preparation 8

While stirring 60 parts of lauric acid melted by heating at 45° C., a mixture comprising 115.5 parts of 10% aqueous ammonia and 150 parts of water, was dropwise added to obtain an aqueous dispersion of ammonium laurate having a solid content of 22%.

Preparation 9

While stirring 60 parts of oleic acid at room temperature, a mixture comprising 74.5 parts of 10% aqueous ammonia and 200 parts of water, was dropwise added to obtain an aqueous solution of ammonium oleate having a solid content of 20.2%.

Preparation 10

60 Parts of montanic acid was heated to 90° C. i.e. higher than the melting point and melted. While stirring the molten montanic acid, 12.2 parts of N,N'-dimethylethanolamine was added. After completion of the mixing, 200 parts of water was dropwise added with stirring to obtain an aqueous dispersion of an amine salt of montanic acid having a solid content of 26.5%.

Preparation of an Aqueous Dispersion of a Fatty Acid

Preparation 11

60 Parts of stearic acid was heated to 72° C. i.e. higher than the melting point and melted, and with stirring, 3 parts of polyoxyethylene polyoxypropylene block polymer was added. After completion of the mixing, 200 parts of water was dropwise added with stirring to obtain an aqueous dispersion of stearic acid having a solid content of 24%.

EXAMPLE 1

To 100 parts as calculated as solid content, of a resol type phenol resin precursor dispersed in water and comprising at most 10% of a monomer, at least 80% of a dimer and at most 1% of free phenol, 3 parts as calculated as the content of the fluorocarbon compound, of the emulsion obtained in Preparation 1, 0.2 part of γ-(2-aminoethyl)aminopropyltrimethoxysilane and 450 parts of water, were blended in an open tank equipped with a stirrer, and with adequate stirring, water was added so that the solid content would be 15%, to obtain a binder for inorganic fiber.

To glass fiber formed by a centrifugal method, the above binder was coated by a spray so that it would be applied in a prescribed amount, and then the fiber was collected into wool on a perforated conveyor under suction by a suction apparatus, to form an intermediate for a heat insulating acoustic inorganic fiber material. The intermediate was heated for 3 minutes in a hot air of 280° C. to cure the binder thereby to obtain a glass wool as a heat insulating acoustic inorganic fiber material of Example 1, having a density of 32 kg/M$^3$, a thickness of 50 mm and an amount of the applied binder of 6.0%.

EXAMPLES 2 TO 4

Glass wools as heat insulating acoustic inorganic materials of Examples 2 to 4 were, respectively, obtained by the same binder preparation method and production method as in Example 1 except that the emulsions of the fluorocarbon compounds obtained in Preparations 2 to 4, were employed.

EXAMPLE 5

50 Parts of the resol type phenol resin precursor of the aqueous dispersion type as used in Example 1, 40 parts of a water-soluble urea resin precursor, 10 parts of a water soluble methylol-modified melamine resin precursor, 0.2 part as calculated as the content of the fluorocarbon compound, of the emulsion obtained in Preparation 4, 0.1 part of γ-(2-aminoethyl)aminopropyltrimethoxysilane and 450 parts of water, were blended in an open tank equipped with a dissolver, and with sufficient stirring, water was added so that the solid content would be 15%, to obtain a binder for inorganic fiber.

Then, a glass wool as a heat insulating acoustic inorganic fiber of Example 5, was obtained in the same production method as in Example 1 except that this binder for inorganic fiber, was employed.

EXAMPLE 6

100 Parts as calculated as the solid content, of the resol type phenol resin precursor of an aqueous dispersion type as used in Example 1, 9.5 parts as calculated as the content of the fluorocarbon compound, of the emulsion obtained in Preparation 3, 0.1 part of γ-glycidoxypropyltrimethoxysilane and 450 parts of water, were blended in an open tank equipped with a dissolver, and with sufficient stirring, water was added so that the solid content would be 15%, to obtain a binder for inorganic fiber.

Then, a glass wool as a heat insulating acoustic inorganic fiber material of Example 6, was obtained by the same production method as in Example 1 except that this binder for inorganic fiber, was employed.

EXAMPLE 7

A glass wool as a heat insulating acoustic inorganic fiber material of Example 7, was obtained by the same preparation method and production method as in Example 6 except that the emulsion obtained in Example 3 was changed to 12.5 parts as calculated as the content of the fluorocarbon compound.

EXAMPLE 8

A glass wool as a heat insulating acoustic inorganic fiber material of Example 8, was obtained under conditions of a density of 16 kg/m$^3$, a thickness of 100 mm and an amount of the applied binder of 4.0% by the same production method as in Example 1 employing the binder for inorganic fiber of Example 1.

EXAMPLE 9

A glass wool as a heat insulating acoustic inorganic fiber material of Example 9, was obtained under conditions of a density of 16 kg/m$^3$, a thickness of 100 mm and an amount of the applied binder of 4.0% by the same production method as in Example 1 employing the binder for inorganic fiber of Example 6.

COMPARATIVE EXAMPLE 1

100 Parts as calculated as solid content, of the resol type phenol resin precursor of an aqueous dispersion type as used in Example 1, 0.1 part of γ-(2-aminoethyl)aminopropyltrimethoxysilane and 450 parts of water, were blended in an open tank equipped with a dissolver, and with sufficient stirring, water was added so that the solid content would be 15%, to obtain a binder containing no water repellent.

Further, a glass wool as a heat insulating acoustic inorganic fiber material of Comparative Example 1, was obtained by the same production method as in Example 1 except that this binder was employed.

COMPARATIVE EXAMPLE 2

100 Parts as calculated as solid content, of the resol type phenol resin precursor of an aqueous dispersion type as used in Example 1, 5 parts as calculated as the content of zinc stearate, of the aqueous dispersion obtained in Preparation 5 and 450 parts of water, were blended in an open tank equipped with a dissolver, and with sufficient stirring, water was added so that the solid content would be 15%, to obtain a binder.

Further, a glass wool as a heat insulating acoustic inorganic fiber material of Comparative Example 2, was obtained by the same production method as in Example 1 except that this binder was employed.

COMPARATIVE EXAMPLE 3

100 Parts as calculated as solid content, of the resol type phenol resin precursor of an aqueous dispersion type as used in Example 1, 5 parts as calculated as the content of poly(dimethylsiloxane), of the aqueous dispersion obtained in Preparation 6, and 450 parts of water, were blended in an open tank equipped with a dissolver, and with sufficient stirring, water was added so that the solid content would be 15%, to obtain a binder.

Further, a glass wool as a heat insulating acoustic inorganic fiber material of Comparative Example 3, was obtained by the same production method as in Example 1 except that this binder was employed.

EXAMPLE 10

100 Parts as calculated as solid content, of the resol type phenol resin precursor of an aqueous dispersion type as used in Example 1, 3 parts as calculated as the solid content of ammonium stearate, of the aqueous dispersion obtained in Preparation 7, and 450 parts of water, were blended in an open tank equipped with a dissolver, and with sufficient stirring, water was added so that the solid content would be 15%, to obtain a binder for inorganic fiber.

A glass wool as a heat insulating acoustic inorganic fiber material of Example 10, was obtained by the same production method as in Example 1 except that the above binder was employed, and the density was 35 kg/m$^3$ and the amount of the applied binder was 8.0%.

EXAMPLES 11 TO 13

Glass wools as heat insulating acoustic inorganic fiber materials of Examples 11 to 13 were, respectively, obtained by the same binder preparation method and production method as in Example 10 except that the aqueous dispersion or the aqueous solution of the salt of the fatty acid obtained in Preparations 8 to 10, was employed.

EXAMPLE 14

50 Parts as calculated as solid content, of a furan resin precursor, 50 parts as calculated as solid content, of a urea resin precursor, 0.1 part as calculated as solid content, of the aqueous dispersion of the amine salt of montanic acid obtained in Preparation 10, 0.1 part of γ-(2-aminoethyl)aminopropyltrimethoxysilane, and 450 parts of water, were blended in an open tank equipped with a dissolver, and with sufficient stirring, water was added so that the solid content would be 15%, to obtain a binder for inorganic fiber.

Then, a glass wool as a heat insulating acoustic inorganic fiber material of Example 14, was obtained by the same production method as in Example 10 except that the abovementioned binder for inorganic fiber was employed, and the binder was cured in a hot air of 300° C.

EXAMPLE 15

100 Parts as calculated as solid content, of the resol type phenol resin precursor of an aqueous dispersion type as used in Example 1, 9.0 parts as calculated as solid content, of the aqueous dispersion of ammonium stearate obtained in Preparation 7, 0.1 part of γ-glycidoxypropyltrimethoxysilane, and 450 parts of water, were blended in an open tank equipped with a dissolver, and with sufficient stirring, water was added so that the solid content would be 15%, to obtain a binder for inorganic fiber.

Then, a glass wool as a heat insulating acoustic inorganic fiber material of Example 15, was obtained by the same production method as in Example 10 except that the abovementioned binder for inorganic fiber was employed.

EXAMPLE 16

A glass wool as a heat insulating acoustic inorganic fiber material of Example 16, was obtained by the same preparation method and production method as in Example 15 except that the aqueous dispersion of ammonium stearate was changed to 12.0 parts as calculated as the solid content.

EXAMPLE 17

A glass wool as a heat insulating acoustic inorganic fiber material of Example 17, was obtained under the conditions of a density of 16 kg/m$^3$, a thickness of 100 mm and an amount of the applied binder of 4.0% by the same production method as in Example 10 employing the binder for inorganic fiber of Example 15.

EXAMPLE 18

A glass wool as a heat insulating acoustic inorganic fiber material of Example 18, was obtained under the conditions of a density of 16 kg/m$^3$, a thickness of 100 mm and an amount of the applied binder of 4.0% by the same production method as in Example 10 employing the binder for inorganic fiber of Example 16.

COMPARATIVE EXAMPLE 4

100 Parts as calculated as solid content, of the resol type phenol resin precursor of an aqueous dispersion type as used in Example 1, 0.1 part of γ-glycidoxypropyltrimethoxysilane, and 450 parts of water, were blended in an open tank equipped with a dissolver, and with sufficient stirring, water was added so that the solid content would be 15%, to obtain a binder containing no water repellent.

Further, a glass wool as a heat insulating acoustic inorganic fiber material of Comparative Example 4, was obtained by the same production method as in Example 10 except that this binder was employed.

COMPARATIVE EXAMPLE 5

100 Parts as calculated as solid content, of the resol type phenol resin precursor of an aqueous dispersion type as used in Example 1, 5 parts as calculated as solid content, of the aqueous dispersion of stearic acid obtained in Preparation 11, and 450 parts of water, were blended in an open tank equipped with a dissolver, and with sufficient stirring, water was added so that the solid content would be 15%, to obtain a binder.

Further, a glass wool as a heat insulating acoustic inorganic fiber material of Comparative Example 5, was obtained by the same production method as in Example 10 employing this binder.

COMPARATIVE EXAMPLE 6

50 Parts as calculated as solid content of a furan resin precursor, 50 parts as calculated as solid content of a urea resin precursor, 3 parts of stearic acid polyoxyethylene glycol ester, 0.1 part of γ-(2-aminoethyl)aminopropyltrimethoxysilane, and 450 parts of water, were blended in an open tank equipped with a dissolver, and with sufficient stirring, water was added so that the solid content would be 15%, to obtain a binder.

Further, a glass wool as a heat insulating acoustic inorganic fiber material of Comparative Example 6, was obtained by the same production method as in Example 10 except that this binder was employed, and curing was carried out in a hot air of 300° C.

COMPARATIVE EXAMPLE 7

100 Parts as calculated as solid content of the resol type phenol resin precursor of an aqueous dispersion type as used in Example 1, 5 parts as calculated as solid content of an aqueous solution of ammonium polyacrylate (ammonium salt of polyacrylic acid) having a molecular weight of about 10,000, and 450 parts of water, were blended in an open tank equipped with a dissolver, and with sufficient stirring, water was added so that the solid content would be 15%, to obtain a binder.

Further, a glass wool as a heat insulating acoustic inorganic fiber material of Comparative Example 7, was obtained by the same production method as in Example 10 employing this binder.

COMPARATIVE EXAMPLE 8

100 Parts as calculated as solid content of the resol type phenol resin precursor of an aqueous dispersion type as used in Example 1, 5 parts as calculated as solid content of the aqueous dispersion of zinc stearate obtained in Preparation 5, 0.1 part of γ-(2-aminoethyl)aminopropyltrimethoxysilane, and 450 parts of water, were blended in an open tank equipped with a dissolver, and with sufficient stirring, water was added so that the solid content would be 15%, to obtain a binder.

Further, a glass wool as a heat insulating acoustic inorganic fiber material of Comparative Example 8, was obtained by the same production method as in Example 10 employing this binder.

All of the binders used in Examples 1 to 18 and Comparative Examples 1 to 8 were excellent in the stability. Further, the emulsion of the fluorocarbon compound, or the aqueous dispersion or the aqueous solution of the ammonium salt or the amine salt of the fatty acid, used in Example, was capable of being uniformly mixed with an aqueous binder and was excellent in the compatibility with other binder components.

TEST EXAMPLES

Evaluation of Water Repellency

From each of the glass wools obtained in Examples 1 to 18 and Comparative Examples 1 to 8, a test specimen of 50×100×100 mm was cut out. The weight and the size of the specimen were measured, and then the specimen was immersed in water at a position of 50 mm from the surface at a water temperature of 25° C. Upon expiration of 24 hours from the initiation of the immersion, the test specimen was taken out and left on a metal net at room temperature of 25° C. for 10 minutes, whereupon the test specimen was weighed.

The weight increase after the immersion was represented by percentage based on the volume before the immersion, which was taken as the volume water absorptivity. Further, the above test specimen, of which the volume water absorptivity was calculated, was left to stand for 6 hours on a metal net, whereupon the test specimen was weighed, whereby the content by mass of water was represented by percentage based on the volume before the immersion, which was taken as the volume water content.

Evaluation of the Adhesive Property

To each of the glass wools obtained in Examples 1 to 9 and Comparative Examples 1 to 3, an olefin type hot melt adhesive was uniformly coated in a proportion of 40 g/m$^2$, and then, a test specimen having a width of 100 mm and a length of 300 mm, was cut out from one having an aluminum craft paper was bonded, and the peeling strength (peel strength) of the aluminum craft paper was measured by a tensile tester.

The evaluation results of Examples 1 to 9 and Comparative Examples 1 to 3 are shown in Table 1.

Further, also with respect to the adhesive property of the aluminum craft paper as the facing material, the test specimens of Examples 1 to 9 are not substantially poor as compared with Comparative Example 1 wherein no water repellent was incorporated. On the other hand, in Comparative Example 2 wherein poly(dimethylsiloxane) was used, and in Comparative Example 3 wherein zinc stearate was

TABLE 1

|  | Ex. 1 | Ex. 2 | Ex. 3 | Ex. 4 | Ex. 5 | Ex. 6 | Ex. 7 | Ex. 8 | Ex. 9 | Comp. Ex. 1 | Comp. Ex. 2 | Comp. Ex. 3 |
|---|---|---|---|---|---|---|---|---|---|---|---|---|
| Volume water absorptivity (%) | 2.5 | 3.4 | 1.5 | 1.7 | 2.1 | 1.4 | 1.4 | 2.7 | 2.2 | 72.5 | 12.5 | 23.6 |
| Volume water content after 6 hrs (%) | 0.3 | 0.8 | 0.2 | 0.2 | 0.5 | 0.2 | 0.2 | 0.4 | 0.5 | 58.4 | 10.6 | 19.4 |
| Peeling strength (g/100 mm width) | 440 | 480 | 450 | 460 | 470 | 430 | 430 | 470 | 480 | 490 | 150 | 210 |

From Table 1, it is evident that with test specimens of Examples 1 to 9, the volume water absorptivity is low, and the volume water content upon expiration of 6 hours from taking out from the immersion, is also low, as compared with used, it is evident that the adhesive property with the facing material deteriorates substantially.

The evaluation results of Examples 10 to 18 and Comparative Examples 4 to 8 are shown in Table 2.

TABLE 2

|  | Ex. 10 | Ex. 11 | Ex. 12 | Ex. 13 | Ex. 14 | Ex. 15 | Ex. 16 | Ex. 17 | Ex. 18 | Comp Ex. 4 | Comp Ex. 5 | Comp Ex. 6 | Comp Ex. 7 | Comp Ex. 8 |
|---|---|---|---|---|---|---|---|---|---|---|---|---|---|---|
| Volume water absorptivity (%) | 2.8 | 3.2 | 2.4 | 2.2 | 4.5 | 2.6 | 2.9 | 6.1 | 6.5 | 72.5 | 16.4 | 48.5 | 28.6 | 12.6 |
| Volume water content after 6 hrs (%) | 0.8 | 0.9 | 0.8 | 0.5 | 1.2 | 0.3 | 0.7 | 1.3 | 1.5 | 10.6 | 5.2 | 9.4 | 15.9 | 4.6 | the test specimens of Comparative Examples 1 to 3. This indicates that the water repellency of the glass wools was improved by the various fluorocarbon compounds used in the Examples.

Further, from the comparison between Example 6 and Example 7, it is evident that no substantial improvement in the water repellency is observed even if the fluorocarbon compound is incorporated in an amount exceeding the above-mentioned preferred range. Further, from the comparison between Example 1 and Example 2, it is evident that the water repellency is higher when the fluorocarbon compound has the above-mentioned preferred molecular weight.

On the other hand, it is evident that in Comparative Example 1 wherein no water repellent was incorporated, both the volume water absorptivity and the volume water content after 6 hours, are substantially inferior to the Examples.

Further, in Comparative Example 2 wherein poly(dimethylsiloxane) was dispersed in water instead of the fluorocarbon compound of Example 1, and in Comparative Example 3 wherein an aqueous dispersion of zinc stearate was employed, the water repellency is poor as compared with the Examples wherein the fluorocarbon compounds are used, although the volume water absorptivity decreases.

From Table 2, it is evident that with the test specimens of Examples 10 to 18, the volume water absorptivity is low, and the volume water content upon expiration of 6 hours after taking out from the immersion, is also low, as compared with the test specimens of Comparative Examples 4 to 8. This indicates that the water repellency of the glass wools was improved by various saturated fatty acids and unsaturated fatty acids used in the Examples.

Further, from the comparison between Example 15 and Example 16, it is evident that no substantial improvement in the water repellency is observed even if the fatty acid is incorporated in an amount exceeding the above-mentioned preferred range.

On the other hand, in Comparative Example 4 wherein no water repellent was incorporated, in Comparative Example 6 wherein a stearic acid polyoxyethylene glycol ester was used instead of the amine salt of montanic acid in Example 14 and in Comparative Example 7 wherein an aqueous solution of ammonium polyacrylate (ammonium salt of polyacrylic acid) having a molecular weight of about 10,000 was used instead of the aqueous dispersion of ammonium stearate in Example 10, both the volume water absorptivity and the volume water content after 6 hours, are substantially poor as compared with the Examples.

Further, in Comparative Example 5 wherein stearic acid was dispersed by means of a polyoxyethylene polyoxypropylene block copolymer as a surfactant instead of the aqueous dispersion of ammonium stearate of Example 10, and in Comparative Example 8 wherein an aqueous dispersion of zinc stearate was used instead of the aqueous dispersion of ammonium stearate of Example 15, it is evident that the volume water content after 6 hours is large, although the volume water absorptivity decreases. It is evident that in Comparative Example 5 wherein the fatty acid was used alone, and in Comparative Example 6 wherein the fatty acid ester was used, the water repellency was poor as compared with the Examples wherein the ammonium salt of the fatty acid or the amine salt of the fatty acid was used.

As described in the foregoing, the binder for inorganic fiber of the present invention, contains a fluorocarbon compound, or an ammonium salt and/or an amine salt of the fatty acid, whereby it is capable of imparting sufficient water repellency to a heat insulating acoustic inorganic fiber material, and even when a facing material for decoration or for preventing moisture or dust, is bonded, the adhesion will not be impaired. Further, the binder for inorganic fiber of the present invention is excellent in stability despite it is of an aqueous type. Further, the heat insulating acoustic inorganic fiber material of the present invention employing this binder for inorganic fiber, has heat insulating and acoustic performance which will not decrease over a long period of time, even when exposed to rainwater or dew drop, and it is thereby possible to solve a problem of germination of fungi, or deterioration of wood or corrosion of metal portions which are in contact therewith. Accordingly, it is suitable for use as a heat insulating material or an acoustic material for housing, buildings, sound insulating walls, cooling towers or instrument installed outdoors.

The entire disclosures of Japanese Patent Application No. 2001-340296 filed on Nov. 6, 2001, Japanese Patent Application No. 2002-045067 filed on Feb. 21, 2002 and Japanese Patent Application No. 2002-258401 filed on Sep. 4, 2002 including specifications, claims and summaries are incorporated herein by reference in their entireties.

What is claimed is:

1. A binder, comprising:
   an aldehyde condensable thermosetting resin precursor and a fluorocarbon compound having a polyfluoroalkyl group;
   wherein the fluorocarbon compound having a polyfluoroalkyl group has a functional group reactive with the aldehyde condensable thermosetting resin precursor or with inorganic fiber;
   wherein said functional group is a hydroxyl group, an amino group, an epoxy group or a methylol group.

2. The binder according to claim 1, wherein the aldehyde condensable thermosetting resin precursor and the fluorocarbon compound having a polyfluoroalkyl group are contained so that, as calculated as solid content, the fluorocarbon compound having a polyfluoroalkyl group is from 0.1 to 10 parts by mass per 100 parts by mass of the aldehyde condensable thermosetting resin precursor.

3. The binder according to claim 1, wherein the fluorocarbon compound having a polyfluoroalkyl group has a molecular weight or a number average molecular weight of at least 500.

4. The binder according to claim 1, which further comprises a silane coupling agent.

5. A heat insulating acoustic inorganic fiber material obtained by applying the binder as defined in claim 1 to inorganic fiber immediately after formation of the inorganic fiber, collecting the inorganic fiber into wool, followed by thermosetting for shaping.

6. The binder according to claim 1, which binds inorganic fiber.

7. The binder according to claim 1, wherein said thermosetting resin precursor is a precursor of a resol phenol resin, a precursor of a melamine rein, a precursor of an urea resin, a precursor of a furan resin or mixtures thereof.

8. The binder according to claim 1, wherein said thermosetting resin precursor is dissolved in water.

9. The binder according to claim 1, wherein said fluorocarbon compound having a polyfluoroalkyl group is a monomer having a polyfluoroalkyl group, an oligomer of a monomer having a polyfluoroalkyl group, a homopolymer of a monomer having a polyfluoroalkyl group or a copolymer of a monomer having a polyfluoroalkyl group.

10. The binder according to claim 1, wherein said polyfluoroalkyl group is a functional group having at least two hydrogen atoms in an alkyl group substituted by fluorine atoms.

11. The binder according to claim 1, wherein said polyfluoroalkyl group has a linear structure or a branched structure.

12. The binder according to claim 1, wherein a terminal portion of said polyfluoroalkyl group is a perfluoroalkyl group.

13. The binder according to claim 1, wherein said functional group is an epoxy group or a methylol group.

14. The binder according to claim 1, wherein said functional group is a hydroxyl group.

15. The binder according to claim 1, wherein said fluorocarbon compound is selected from the group consisting of a compound of formula (I):

$$CF_3(CF_2)_9SO_2N(CH_3)CH_2CH_2OH \quad (I),$$

a compound of formula (II):

$$CF_3(CF_2)_4CH_2CH_2OH \quad (II), \text{ and}$$

a mixture and:

$$CH_2=CHCOOCH_2CH_2(CF_2)_nCH_3,$$

wherein n is 5, 7, 9, 11 and 13.

* * * * *